US 8,199,117 B2

(12) United States Patent
Izadi et al.

(10) Patent No.: US 8,199,117 B2
(45) Date of Patent: Jun. 12, 2012

(54) ARCHIVE FOR PHYSICAL AND DIGITAL OBJECTS

(75) Inventors: Shahram Izadi, Cambridge (GB); Abigail J Sellen, Cambridge (GB); Richard M Banks, Egham (GB); Stuart Taylor, Cambridge (GB); Stephen E Hodges, Cambridge (GB); Alex Butler, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1034 days.

(21) Appl. No.: 11/746,397

(22) Filed: May 9, 2007

(65) Prior Publication Data

US 2008/0281851 A1 Nov. 13, 2008

(51) Int. Cl.
*G06F 3/041* (2006.01)
(52) U.S. Cl. .......... 345/173; 345/156; 345/175
(58) Field of Classification Search .......... 345/173, 345/175, 156
See application file for complete search history.

(56) References Cited

U.S. PATENT DOCUMENTS

| | | | | |
|---|---|---|---|---|
| 5,732,227 A * | 3/1998 | Kuzunuki et al. | ............ | 715/775 |
| 6,005,547 A | 12/1999 | Newman et al. | | |
| 6,340,978 B1 | 1/2002 | Mindrum | | |
| 6,375,344 B1 * | 4/2002 | Hanson et al. | ............ | 710/303 |
| 6,545,660 B1 * | 4/2003 | Shen et al. | ............ | 345/156 |
| 6,597,255 B1 * | 7/2003 | Turton | ............ | 333/12 |
| 6,710,754 B2 | 3/2004 | Hanson et al. | | |
| 6,760,884 B1 | 7/2004 | Vertelney et al. | | |
| 6,886,047 B2 | 4/2005 | Leong et al. | | |
| 6,894,703 B2 * | 5/2005 | Vernier et al. | ............ | 345/619 |
| 7,134,756 B2 * | 11/2006 | Drucker et al. | ............ | 353/77 |
| 7,254,665 B2 * | 8/2007 | Yee | ............ | 345/557 |
| 7,327,376 B2 * | 2/2008 | Shen et al. | ............ | 345/676 |
| 7,358,962 B2 * | 4/2008 | Dehlin et al. | ............ | 345/173 |
| 7,379,047 B2 * | 5/2008 | Drucker et al. | ............ | 345/156 |
| 7,394,459 B2 * | 7/2008 | Bathiche et al. | ............ | 345/175 |
| 7,397,464 B1 * | 7/2008 | Robbins et al. | ............ | 345/173 |
| 7,466,308 B2 * | 12/2008 | Dehlin | ............ | 345/175 |

(Continued)

FOREIGN PATENT DOCUMENTS

| | | | |
|---|---|---|---|
| GB | 2394843 | | 5/2004 |
| GB | 2394843 A | * | 5/2004 |
| WO | WO2005024865 | | 3/2005 |

OTHER PUBLICATIONS

Shen et al, "Story Sharing Around the Table", Apr. 2003, Mitsubishi Electric Research Labs, pp. 1-8.*

(Continued)

*Primary Examiner* — Richard Hjerpe
*Assistant Examiner* — Dorothy Harris
(74) *Attorney, Agent, or Firm* — Lee & Hayes, PLLC

(57) ABSTRACT

Existing tools for organizing family memories offer few possibilities for easily integrating both physical and digital materials in order to produce a single archive for a family (or other group of users). This also applies to archiving of physical objects and digital media in general (even for applications outside the field of family use). An archiving system is described which incorporates at least one image capture device, a display, a sensing apparatus arranged to detect user input associated with the display, a processor and memory, and a receptacle for holding digital media storage devices such as mobile telephones, digital cameras, personal digital assistants and the like. The image capture device is operable to capture digital images of physical objects for archiving. The receptacle comprises a data transmission apparatus for automatically transferring data with the digital media storage devices and optionally also a power charging apparatus.

17 Claims, 12 Drawing Sheets

U.S. PATENT DOCUMENTS

| | | | |
|---|---|---|---|
| 7,467,380 B2* | 12/2008 | Kurlander et al. | 717/174 |
| 7,511,703 B2* | 3/2009 | Wilson et al. | 345/175 |
| 7,525,538 B2* | 4/2009 | Bathiche | 345/175 |
| 7,627,831 B2* | 12/2009 | Chiu et al. | 715/767 |
| 7,686,682 B2* | 3/2010 | Diakopoulos et al. | 463/11 |
| 7,743,348 B2* | 6/2010 | Robbins et al. | 715/863 |
| 7,898,505 B2* | 3/2011 | Blythe et al. | 345/30 |
| 7,970,870 B2 | 6/2011 | Hinckley et al. | |
| 2001/0006855 A1* | 7/2001 | Koitsalu | 439/188 |
| 2001/0011026 A1* | 8/2001 | Nishijima | 455/557 |
| 2002/0101418 A1* | 8/2002 | Vernier et al. | 345/418 |
| 2002/0163537 A1* | 11/2002 | Vernier et al. | 345/751 |
| 2003/0147386 A1 | 8/2003 | Zhang et al. | |
| 2004/0046784 A1* | 3/2004 | Shen et al. | 345/733 |
| 2005/0052156 A1* | 3/2005 | Liebenow | 320/128 |
| 2005/0116683 A1 | 6/2005 | Cheng et al. | |
| 2005/0122308 A1* | 6/2005 | Bell et al. | 345/156 |
| 2005/0147218 A1 | 7/2005 | Novack et al. | |
| 2005/0181839 A1* | 8/2005 | Tiainen et al. | 455/573 |
| 2005/0183035 A1* | 8/2005 | Ringel et al. | 715/811 |
| 2005/0219204 A1* | 10/2005 | Huddleston et al. | 345/156 |
| 2005/0248729 A1* | 11/2005 | Drucker et al. | 353/71 |
| 2006/0039030 A1 | 2/2006 | Peterschmidt | |
| 2006/0119541 A1* | 6/2006 | Blythe et al. | 345/31 |
| 2006/0205381 A1 | 9/2006 | Beart et al. | |
| 2006/0230192 A1* | 10/2006 | Parry et al. | 710/15 |
| 2006/0267952 A1 | 11/2006 | Alcorn | |
| 2007/0030254 A1 | 2/2007 | Robrecht et al. | |

OTHER PUBLICATIONS

Hideki et al,Information Layout and Interaction on Virtual and Real Rotary Tables, Oct. 10-12, 2007, Horizontal interactive Human-Computer Systems, 2007 TABLETOP '07 Second Annual IEEE International Workshop, pp. 95-102.*

Apted et al, "Sharing Digital Media on Collaborative Tables and Displays Technical Report 602", Nov. 13, 2006, School of Information Technologies University of Sydney, 1-10.*

K. Everitt, "UbiTable: Impromptu Face-to-Face Collaboration on Horizontal Interactive Surfaces", Sep. 2003, Mitsubishi Electric Research Laboratories, pp. 1-11.*

Abowd, et al., "The Family Video Archive: An Annotation and Browsing Environment for Home Movies", available at least as early as Mar. 12, 2007, at <<http://delivery.acm.org/10.1145/980000/973266/p1-abowd.pdf?key1=973266&key2=9710583711&coll=&dl=acm&CFID=15151515&CFTOKEN=6184618>>, ACM, 2003, pp. 1-8.

Beagrie, "Plenty of Room at the Bottom? Personal Digital Libraries and Collections", retrieved on Mar. 14, 2007, at <<http://www.dlib.org/dlib/june05/beagrie/06beagrie.html>>, Neil Beagrie, vol. 11, No. 6, 2005, pp. 1-9.

"DiamondTouch", retrieved on Mar. 9, 2007, at <<http://www.merl.com/projects/DiamondTouch>>, Mitsubishi Research Laboratories, 2006, pp. 1-2.

Gokturk, et al., "A Time-Of-Flight Sensor-System Description, Issues and Solutions", Proceedings of the 2004 Conference on Computer Vision and Pattern Recognition Workshop, p. 35, 2004, pp. 1-9.

Ishii, et al., "ClearBoard: A Seamless Medium for Shared Drawing and Conversation with Eye Contact", ACM, 1992, pp. 1-10.

Newman, et al., "CamWorks: A Video-Based Tool for Efficient Capture from Paper Source Documents", Proceedings of the IEEE International Conference on Multimedia Computing Systems, vol. 2, p. 647, 1999, pp. 1-7.

Niclass, et al., "A CMOS 3D Camera with Millimetric Depth Resolution", IEEE Custom Integrated Circuits Conference, p. 705-708, Oct. 2004, pp. 1-4.

"Swiss Ranger SR-2 Datasheet", CSEM, 2004, pp1.

Wilson, "PlayAnywhere: A Compact Interactive Tabletop Projection-Vision System", UIST '05, Oct. 23-27, 2005, pp. 1-10.

Buxton, "Multi-Touch Systems That I Have Known and Loved", available available at least as early as Feb. 9, 2007, at <<http://www.billbuxton.com/multitouchOverview.html>>, 2007, pp. 1-21.

"Ecoupled Technology Executive Summary", Version 1.2, available as early as May 2007, pp. 1-6.

Leigh, et al., "DiamondTouch Characteristics and Capabilities", pp. 1-2, .In: UbiComp 2002 Workshop on Collaboration with Interactive Tables and Walls, Goteborg, Sweden (2002), retrieved at <<http://www.ipsi.fraunhofer.de/ambiente/collabtablewallws/papers/leigh,%20merl,%20dt.pdf>>, 2 pages.

Mazalek, "Sharing and Browsing Media on a Digital Tabletop", available at least as early as Mar. 12, 2007, at <<http://alumni.media.mit.edu/~matt/cv/tviews_carpe_03.pdf>>, pp. 1-11.

"Socio-Digital Systems", available at least as early as Mar. 14, 2007, at <<http://research.microsoft.com/sds/>>, pp. 1-10.

Izadi et al., "Dynamo: A public interactive surface supporting the cooperative sharing and exchange of media", Proceedings of the 16th annual ACM symposium on User interactive software and technology, 2003, pp. 159-168.

OA from U.S. Appl. No. 13/109,765; dated Aug. 15, 2011; 17 pages.

Patten et al., "Sensetable: A Wireless Object Tracking Platform for Tangible User Interfaces", Proceedings of CHI 2001, Mar. 31-Apr. 5, 2001, ACM Press, 8 pages.

* cited by examiner

ARCHIVE FOR PHYSICAL AND DIGITAL OBJECTS

BACKGROUND

Groups of individuals such as families, sports teams, school house groups, or other groups of individuals who work or collaborate with one another often collect a great deal of material in order to capture and preserve group memories or for other purposes such as education and knowledge sharing. This material may be in physical form, such as printed photographs, sports trophies, mascots, art work, birthday cards, theatre tickets etc. It may also be in digital form such as digital photographs and home videos. For example, there is a burgeoning amount of digital media which families capture and collect using a range of devices including camcorders, digital cameras, and, increasingly, mobile phones.

Existing tools for organizing family memories offer few possibilities for easily integrating both physical and digital materials in order to produce a single archive for a family (or other group of users). Furthermore, most families feel a great deal of guilt about the fact that these materials all exist in different places, and are often collected but never properly organized. At the same time, many households report that, if there were a fire in the house, aside from rescuing loved ones and pets, family memorabilia such as photos would be the next things that would be rescued. These materials are therefore very valuable to households and families, yet we have no good coherent systems to allow us to easily archive and organize such family physical and digital media in a manner that is simple to use. This also applies to archiving of physical objects and digital media in general (even for applications outside the field of family use).

Existing archiving systems often have complex user interfaces and detailed systems for annotating and labeling items with key words in order to organize the items. This leads to problems for novice users who find it difficult to operate complex systems for archiving and accessing items from the archive.

It will be understood that the invention is not limited to implementations that solve any or all of the above noted disadvantages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Existing tools for organizing family memories offer few possibilities for easily integrating both physical and digital materials in order to produce a single archive for a family (or other group of users). This also applies to archiving of physical objects and digital media in general (even for applications outside the field of family use). An archiving system is described which incorporates at least one image capture device, a display, a sensing apparatus arranged to detect user input associated with the display, a processor and memory, and a receptacle for holding digital media storage devices such as mobile telephones, digital cameras, personal digital assistants and the like. The image capture device is operable to capture digital images of physical objects for archiving. The receptacle comprises a data transmission apparatus for automatically transferring data with the digital media storage devices and optionally also a power charging apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a family archive system, the system described is provided as an example and not a limitation. As those skilled in the art will appreciate, the present examples are suitable for application in a variety of different types of archives for physical objects and digital media, for use by single individuals or groups of individuals who may or may not be family groups.

The term "touch panel display" is used to refer to a surface arranged to display digital images electronically and where the surface is also arranged to detect a physical object (such as a stylus, human digit, playing piece, or tagged object such as a puck) which either makes contact with the surface or which is close to but not in actual contact with the surface. The digital images displayed may be of any suitable type such as video, still images, electronic drawings, graphical user interface features, or any other type of digital images. Some examples of touch panel displays have functionality to enable discrimination between events where objects come into contact with the touch panel and events where objects merely come into close adjacency with the touch panel.

The term "multi-touch panel display" is used to refer to a touch panel display which is able to both detect two or more co-occurring physical objects (or parts of the same object) which either make contact with the surface or come close to but do not make actual contact with the surface and discriminate between those two or more physical contacts.

An Exemplary Apparatus

Figure 1:
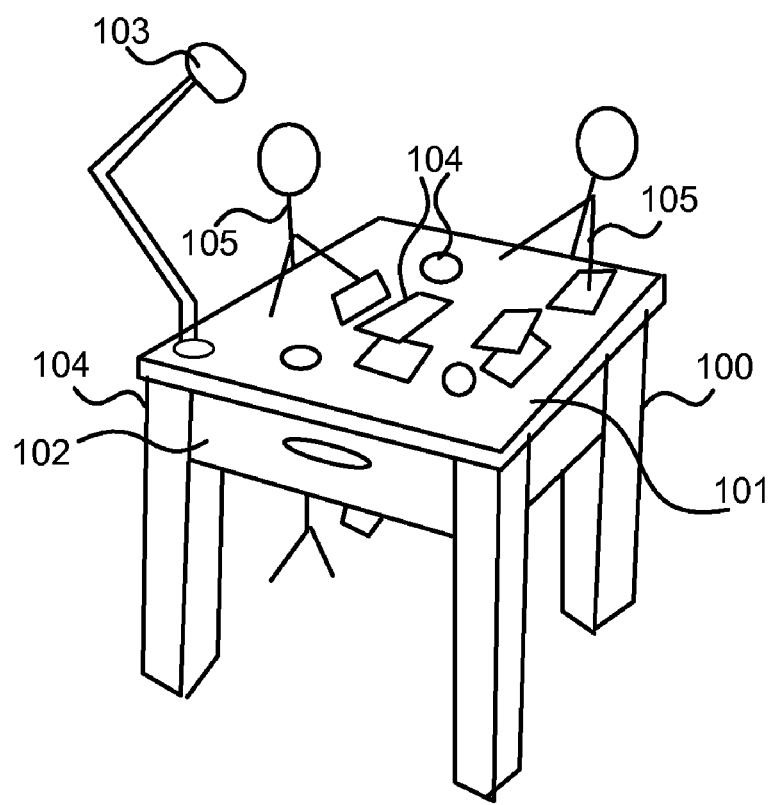
FIG. 1 is a schematic diagram of an example archiving system.

FIG. 1 is a schematic diagram of an example archiving system which is provided in the form of a table 100 with a drawer 102. For example, the table may be for domestic use such as in a family living room. The table has a display 101 at the table top and a camera 103 supported on an articulated arm so that its field of view comprises at least part of the display. The table optionally has a microphone and loudspeaker embedded or integrated into it.

The display 101 may be any suitable type of display for presenting digital images. A non-exhaustive list of examples is: a touch panel display, a multi-touch panel display, an area onto which information is projected either using front or rear projection, a liquid crystal display, a plasma screen. The display is suitable for presenting digital images such as videos, digital photographs, scanned documents, 3D images of physical objects and the like. It is also suitable for presenting graphical user interface items such as menus, dialog boxes and the like.

In some embodiments the display 101 may be integrated into the table top. For example, in the case of a touch panel display, multi-touch panel display or liquid crystal display. In other embodiments the display 101 comprises the table top itself. For example, in the case of front projection such as where a micro-projector may be integrated with the camera 103.

The archiving system also comprises a sensing apparatus, associated with the display 101. The sensing apparatus is arranged to detect user input to the archiving system comprising position of one or more physical objects on or above the display. For example, the sensing apparatus may comprise an image capture device such as a camera positioned over table or below table. In the case of an over table camera, camera 103 may be used as at least part of the sensing apparatus. The sensing apparatus may also be integral with the display itself in some cases such as in the case of a touch panel display using retro-reflective opto sensors. In some examples, the sensing apparatus is arranged to sense not only the position of physical objects (such as a user's hand, digit, playing piece, puck or the like) above the screen, but is also able to detect movement of such objects in relation to information presented on the display.

The drawer 102 is sized and shaped to hold one or more digital hand-held media storage devices such as mobile telephones, personal digital assistants (PDAs), digital cameras, and the like. The drawer also optionally comprises a power charging apparatus (not shown in FIG. 1) which provides automatic power charging of media storage devices in the drawer. For example, inductive pads for achieving this automated power charging may be embedded in the drawer base and/or walls. This is described in more detail below.

The drawer also comprises a data transmission apparatus arranged at least to receive data from any media storage devices in the drawer. This data transmission apparatus may operate using wired communications or may provide physical connectionless data transmission with the media storage devices.

The table 100 also comprises a processor having an associated memory both of which may be incorporated into the table itself and not visible to the user. For example, the processor and memory are provided using a personal computer (PC) which may be a tablet PC. The processor comprises a data communications link to a server or communications network. The camera 103 is connected to the processor such that images captured by the camera 103 may be transferred to the processor and its memory. The sensing apparatus is also in communication with the processor such that output from the sensing apparatus may be transferred to the processor. Also, the processor is arranged to control the display.

The archiving system may be used by one or more users 105 at the same time. Physical objects 104 such as printed photographs, printed paper items, a child's first pair of shoes or other objects may be placed on the display during use.

The memory of the archiving system may be used to archive digital media items of any suitable type. A non-exhaustive list of examples is: music files, short message service (SMS) messages, email messages, voice mail messages, digital photographs, digital videos, text documents, ringtones, multimedia messages, web pages, calendar entries.

Exemplary Method

For example, the archiving system 100 is used to capture images of a physical object that it is required to archive. In the example of FIG. 1, physical objects 104 may be placed in the field of view of the camera 103 by placing them appropriately on the display 101. The camera 103 position may be adjusted by the users 105 if necessary using the articulated arm supporting the camera. A simple user interface is used to instruct the camera 103 to capture one or more images of the physical object 104. The user interface may be provided at any suitable location such as in the table top, as part of the display 101, or on the camera itself. For example, the camera may be a video camera and the user interface may comprise a single button which when activated causes the camera to record. This button may be a large, physical button provided to the side of the display 101. However, this is not essential. Any type of user interface may be used. The captured images are then displayed at the display 101 and are stored on the basis of user input received at the sensing apparatus. In this way, images of physical objects may be captured and stored in an archive in a simple and effective manner. More detail about the process of capturing the images and storing those is given later with reference to FIG. 8.

The archiving system 100 may also be used to capture sounds using the microphone. For example, human speech may be recorded and stored in the archive associated with another digital media item such as an image. This enables users to store speech, for example, explaining facts about a physical object whose image is stored in the archive. A loudspeaker or other transducer for audio playback may be provided to enable sound recordings stored in the archive to be played back.

The archiving system 100 is also able to receive digital media items that have already been created or captured using other devices. For example, hand-held digital media storage devices such as mobile telephones, personal digital assistants (PDAs), digital music storage devices, digital cameras, and the like. These digital media storage devices may be placed in the drawer 102 in order to enable digital data from those items to be uploaded onto the archiving system 100. Similarly, digital data from the archiving system may be transferred to the hand-held digital media storage devices. For example, the drawer 102 may have embedded data transmission devices which optionally also provide power charging functionality. The data transmission devices and power charging functionality are described in more detail below. Thus the drawer 102 not only provides a safe and secure storage area for hand-held digital media storage devices, which is out of sight of small children, but it also provides functionality for data synchronization between those devices and the archiving system as well as (optionally) for safe, simple, and cost effective power charging.

Once a digital media storage device such as a mobile telephone is placed in the drawer, and the drawer is closed, a user may be presented with a display at the display 101 indicating the presence of the mobile telephone and showing its current power charge status and data synchronization status. Data synchronization may proceed automatically without input from the user or may occur as a result of specific user input. In the case that power charging is also provided this may also proceed automatically or as a result of specific user input.

Digital media items received from items in the drawer may be represented on the display, for example, as a pile of unsorted images or in any other suitable manner. A user is then able to sort through, view and organize those media items using the display 101 and sensing apparatus. The display and associated sensing apparatus provides a simple and intuitive user interface and in some examples is a multi-touch panel display. User input at the display and associated sensing apparatus (for example, two-handed user input) allows the triaging, editing and organizing of the media items, be they captured images from the image capture device or media items uploaded from the hand-held digital media storage devices. The media items may be annotated for example, using a stylus pen input device or in any other suitable manner. Key words may be associated with the media items, either automatically using suitable image processing software or by receiving user input. Album making software may be provided at the archiving system to enable users to create albums of digital media items using the display. The media items are stored at the memory incorporated in the archiving system 100 and may be backed-up automatically to another storage location via a communications network to which the archiving system is connected.

The display 101 and sensing apparatus may also be used to provide a user interface which enables a user to access and display items from the archive. For example, digital media items may be retrieved on the basis of stored time information associated with those items or on the basis of stored event information associated with those items. The interface may also be arranged to provide browsing of the archived digital media items. The interface may provide additional functionality such as enabling items from the archive to be emailed or transferred in any suitable manner to another location via the communications network. It may also be used to post items to a web site, to print items, to edit items and to carry out other operations on the media items.

Another Exemplary Apparatus

Figure 2:
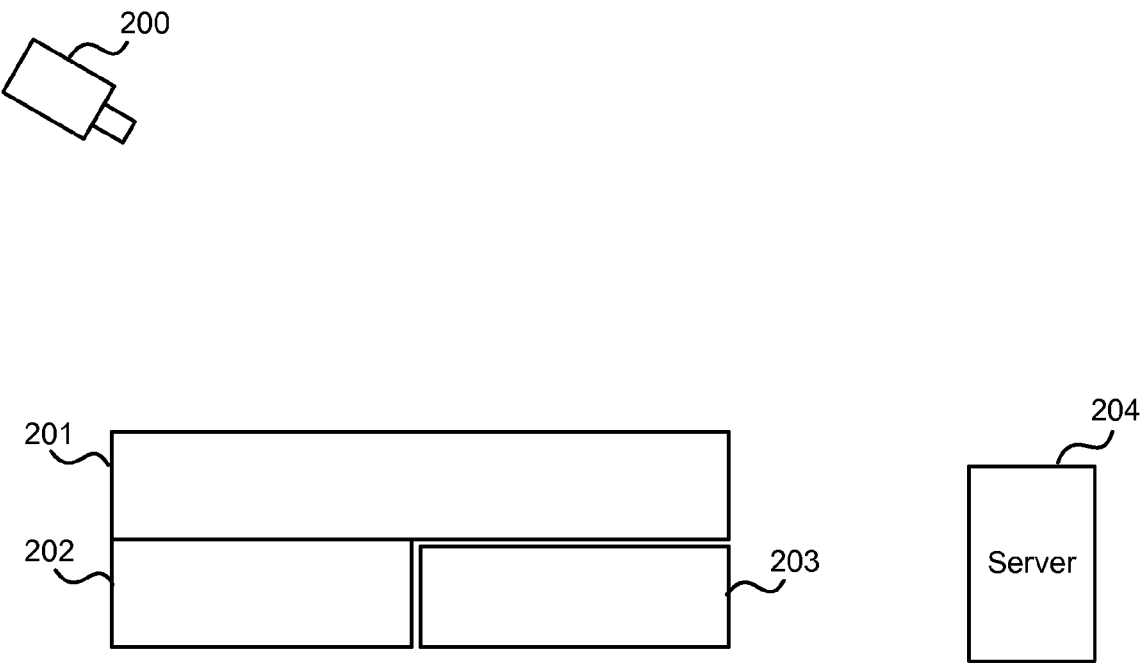
FIG. 2 is a schematic side view of another example archiving system.

FIG. 2 is a schematic side view of another example archiving system. A display 201 is provided above a drawer 202 and a personal computer 203. These items need not be integrated into a table as described with reference to FIG. 1. Rather, they may be provided in any suitable form such as a stand alone unit, or be integrated into a work surface. An image capture device 200 is provided such as a camera. It is positioned such that its field of view comprises at least part of the display. The archiving system is in communication with a server 204 to enable back-up of digital media from the archive. The apparatus of FIG. 2 may be used in a similar manner to that described above with reference to FIG. 1.

Another Exemplary Apparatus

Figure 3:
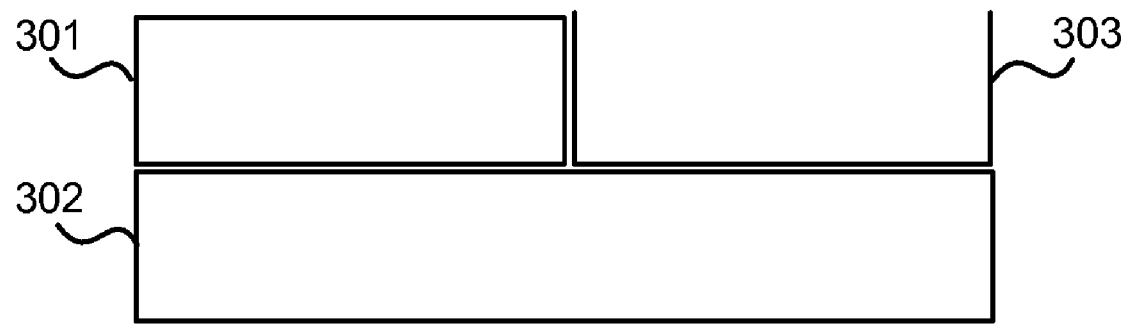
FIG. 3 is a schematic side view of another example archiving system.

It is not essential to use a drawer to hold the hand-held digital media storage devices as described above with reference to FIGS. 1 and 2. Another option is to use a bowl, tray or any other suitable receptacle which is sized and shaped to hold two or more hand-held digital media storage devices. FIG. 3 is a schematic side view of an archiving system having a bowl 303 provided alongside a display 301 and arranged to hold hand-held digital media storage devices. A personal computer 302 is provided below the display and bowl 303. Data synchronization functionality, and optionally power charging functionality, may be embedded in the bowl or other receptacle in a similar manner as for the drawer 202, 102 of the earlier examples. The apparatus of FIG. 3 may be used in a similar manner to that described above with reference to FIG. 1.

More Detail about the Data Synchronization Functionality and Optional Power Charging Functionality is Now Given In some embodiments the receptacle comprises power charging apparatus, integral with, attached to, or embedded in the receptacle itself. However, it is not essential to provide power charging apparatus. The power charging apparatus is suitable for charging hand-held digital media storage devices such as mobile telephones, digital cameras, personal digital assistants and the like. For example, this may comprise an inductive charging mat or apparatus such as those currently commercially available from Splashpower Limited™. This technology enables a portable device to be recharged without an electrical contact and also to transmit, receive or synchronize data with another unit. The device to be recharged may or may not require retrofitting of a recharging unit depending on its design. This type of technology is described in detail in UK Patent Application GB 2394843, US Patent Application US 2006/0205381 A1, US Patent Application US 2005/0116683 and WO 2005/024865 A2. Inductively coupled power charging technology for power and data transmission is also available from Fulton Innovations, LLC under the brand eCoupled technology™.

Figure 4:
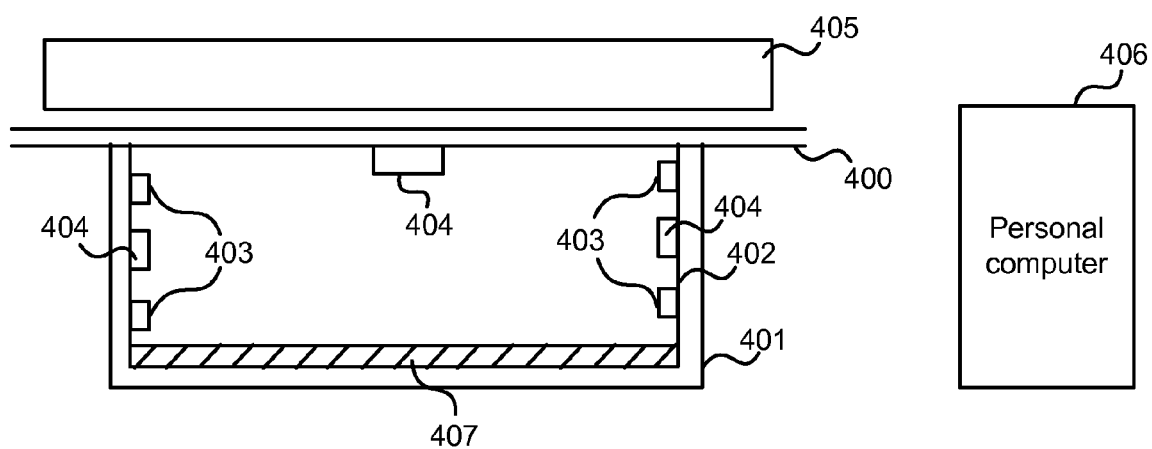
FIG. 4 is a schematic cross-section through an example archiving system.

FIG. 4 is a schematic cross-section through a drawer 402 of an archiving system such as that of FIG. 1 or FIG. 2. A display 405 is shown above the drawer and a personal computer 406 is in communication with the archiving system for back-up purposes. The drawer is optionally provided with a shield to electro-magnetic radiation 400, 401 such as a metal layer provided around the drawer such that when the drawer is closed it forms a Faraday cage. Electronic equipment stored inside the drawer is then protected from electrostatic discharges. Also, electro-magnetic radiation from items in the drawer and from the power charging apparatus is prevented from leaking from the archiving system into the environment.

The base of the drawer may comprise an inductive power charging mat 407 such as that described above. Similar inductive power charging apparatus may be provided in the walls of the drawer and/or on the surface above the drawer.

In some embodiments antennas such as Bluetooth (trade mark) antennas 403 with reduced range are attached to the inside walls of the drawer. These provide means for data transmission between any hand-held digital media storage devices in the drawer and a personal computer 203 (FIG. 2) integrated into the archiving system. However, it is not essential to use such antennas 403 for data transmission. In cases where power charging apparatus is provided, this may itself provide data transmission functionality as described above.

In some embodiments the data transmission apparatus is wired such that hand-held digital media storage devices placed in the receptacle are physically connected to the data transmission apparatus. For example, cradles for the media storage devices may be provided in the receptacle for this purpose. USB connections may also be provided in the receptacle or any other suitable type of connections for data transmission.

In some embodiments the drawer may comprise one or more image capture devices 404 which may be cameras of any suitable type. For example, these image capture devices 404 are used to capture images of physical objects placed in the drawer and which it is required to archive. These image capture devices may be used instead of, or in addition to, the image capture device 103, 200 of FIGS. 1 and 2.

In some embodiments the antennas 403 and the image capture devices 404 are used to obtain information about the position and outline of any devices in the drawer 402. This is described in more detail later with reference to FIG. 9.

In some embodiments the depth of the drawer 402 is sized relative to standard media storage devices such that those media storage devices are forced to lie flat in the drawer in order for the drawer to close. This promotes increased areas of physical contact between the media storage devices and the drawer base so that inductive charging and/or data transmission is enhanced.

More Detail about the Display is Now Given

Any suitable type of display may be used as mentioned above. For example, in the case of touch panel displays, these may use resistive touch panels in which touching the screen causes layers, which are normally separated by a small gap, to come into contact or a capacitive touch panel in which contact with a conductive object changes the capacitance. Another type of touch screen technology uses optical sensors (e.g. an optical sensor array) to detect when a screen is touched. Any of these types of touch panel may be used in the archiving system described herein and these are intended as a non-exhaustive list of examples.

In some embodiments the touch panel display is a multi-touch panel display.

Figure 5:
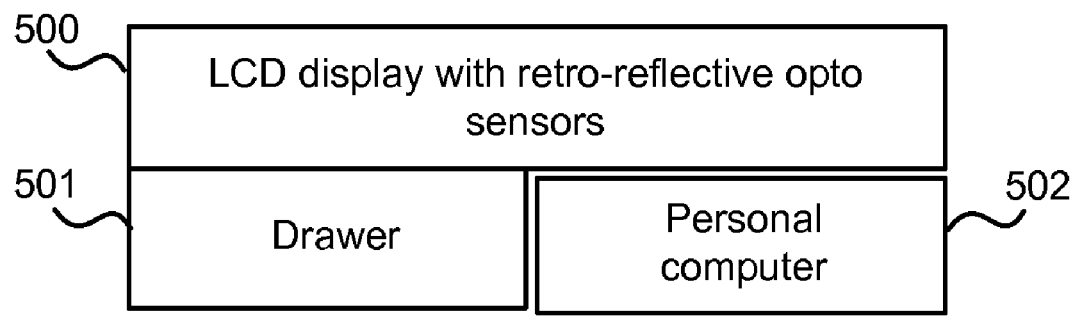
FIG. 5 is a schematic side view of an example archiving system using a display having retro-reflective opto sensors.

In one example a multi-touch panel display is provided as now described with reference to FIG. 5. The multi-touch panel 500 comprises a liquid crystal display (LCD) having retro-reflective opto sensors embedded behind it. This multi-touch panel 500 is placed over a drawer 501 and personal computer 502 or used in any of the arrangements described above with reference to FIGS. 1, 2, 3 and 4. In this embodiment it is not essential to use an image capture device over the touch panel display. Instead, image capture devices may be provided in the receptacle or the touch panel itself may be used to capture images of physical objects to be archived.

Figure 6:
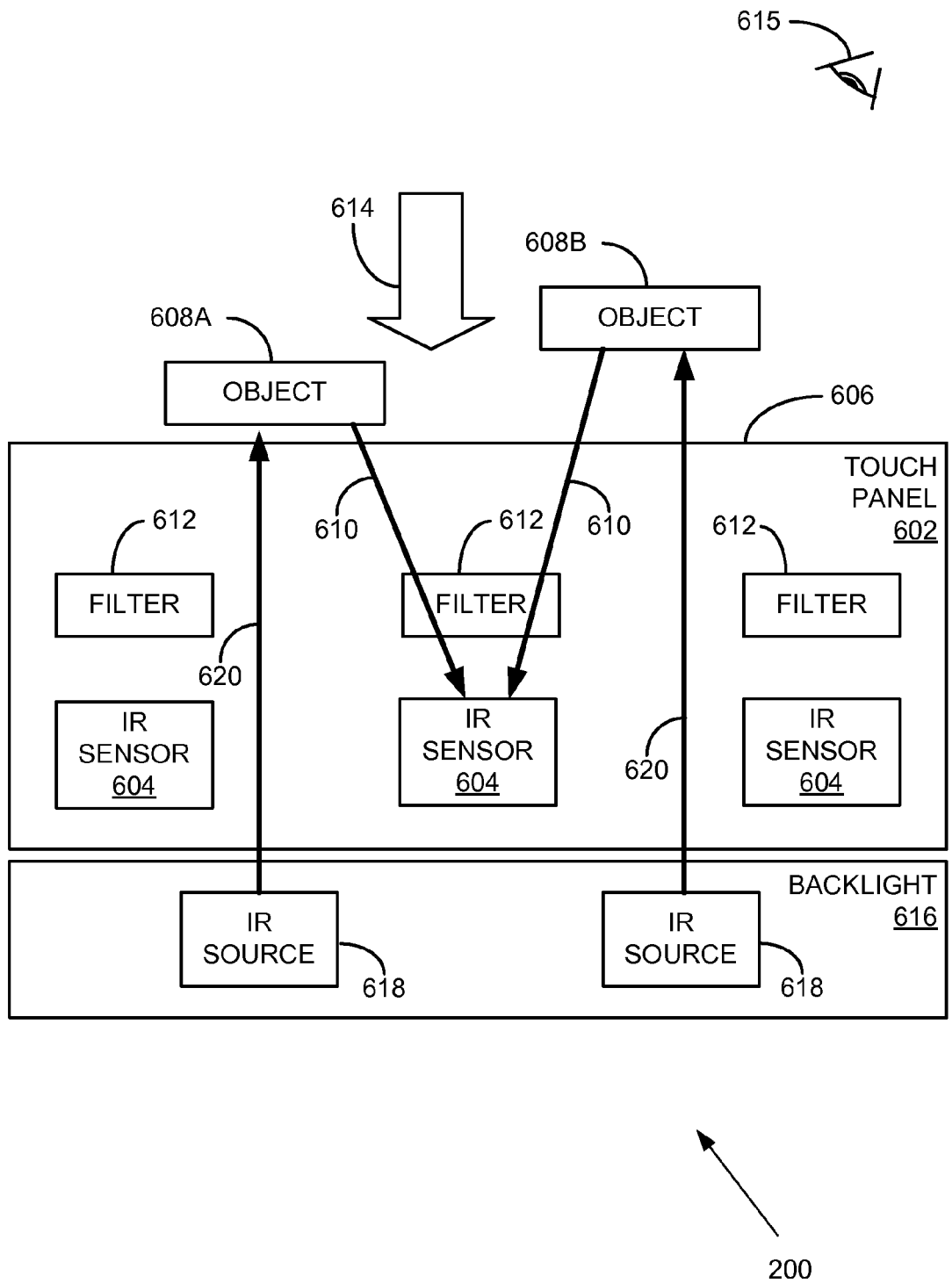
FIG. 6 illustrates a cross-section through an exemplary touch panel display.

Details about the multi-touch panel 500 are now described with reference to FIG. 6. which illustrates a cross-section of an exemplary touch panel display. A touch panel display 500 comprises a touch panel 602 that has several infrared (IR) sensors 604 integrated therein. Objects above a touchable surface 606 include an object 608A that is in contact with touchable surface 606 and an object 608B that is close to but not in actual contact with ("adjacent") touchable surface 606. Infrared sensors 604 are distributed throughout touch panel 602 parallel to touchable surface 606. One of infrared sensors 604 may detect infrared radiation reflected from objects 608A and 608B, as indicated by arrows 610. Although the term "above" is used in this description, it should be understood that the orientation of the touch panel system is irrelevant. As shown in FIG. 6, touchable surface 606 is horizontal, but in a different embodiment generated by rotating system 500 clockwise by 90 degrees, touchable surface 606 could be vertical. In that embodiment, the objects from which reflected IR radiation is detected are to the side of touchable surface 606. The term "above" is intended to be applicable to all such orientations.

Touch panel 602 may comprise filters 612 that absorb visible light and transmit infrared radiation and are located between touchable surface 606 and IR sensors 604 in order to shield IR sensors 604 from visible light 614 incident on touchable surface 606 in the case where IR sensors 604 are sensitive to a broader range of wavelengths of light other than purely infrared wavelengths.

Touch panel 602 may comprise a display that is configured to display images that are viewable via touchable surface 606. An eye 615 indicates a possible direction from which the images are viewed. The display may be, for example, an LCD, an organic light emitting diode (OLED) display, a flexible display such as electronic paper, or any other suitable display in which an IR sensor can be integrated.

System 500 may comprise a backlight 616 for the display. Backlight 616 may comprise at least one IR source 618 that is configured to illuminate objects in contact with or adjacent touchable surface 606 with infrared radiation through touchable surface 606, as indicated by arrows 620. IR sensor 604s are only sensitive to radiation incident from above, so IR radiation traveling directly from backlight 616 to IR sensor 604s is not detected.

The output of IR sensors 604 may be processed to identify a detected infrared image. The IR radiation reflected from the objects may be reflected from reflective ink patterns on the objects, metal designs on the objects or any other suitable reflector. For example, white paper reflects IR radiation and black ink absorbs IR radiation, so a conventional bar code on a surface of an object may be detected by an infrared-sensing device according to the described technology. Fingers are estimated to reflect about 10% of the near IR, which is sufficient to detect that a finger or hand is located at a particular location on or adjacent the touchable surface. A higher resolution of IR sensors may be used to scan objects to do applications such as document scanning and fingerprint recognition. For example, fingerprint recognition generally requires a resolution of more than 200 dots per inch (dpi).

FIG. 6 provides just one example of an exemplary touch panel system. In other examples, the backlight may not comprise any IR sources and the touch panel may include a frontlight which comprises at least one IR source. In such an example, the touchable surface of the system is a surface of the frontlight and not of the touch panel. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch panel may comprise an OLED display which comprises IR OLED emitters and IR-sensitive organic photosensors (which may comprise reverse-biased OLEDs).

For some applications, it may be desirable to detect an object only if it is in actual contact with the touchable surface of the touch panel system. The IR source of the touch panel system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

IR sensors 604 may comprise suitable infrared-sensitive semiconductor elements. A non-exhaustive list of examples of semiconductor material that is infrared-sensitive includes polycrystalline silicon, monocrystalline silicon, microcrystalline silicon, nanocrystalline silicon, plastic semiconductors and other non-silicon based semiconductors. Devices based on polycrystalline, microcrystalline, monocrystalline or nanocrystalline silicon may have better stability than amorphous silicon devices. TFTs based on polycrystalline, microcrystalline, monocrystalline or nanocrystalline silicon may have higher field mobility than amorphous silicon TFTs.

In another example a multi-touch panel display is provided as now described with reference to FIG. 7. A stylus enabled digital liquid crystal display 704 is provided having a resistive touch overlay 703 and a polarizing filter 702 over the resistive touch overlay 703. The display 704 is positioned over a drawer 705 and a personal computer 706 or used in any of the other arrangements described above with reference to FIGS. 1 to 4. In this embodiment an image capture device such as a video camera 700 is used having a field of view which comprises at least part of the display 704. The image capture device has a polarizing filter 701 which is crossed with respect to the polarizing filter 702 at the display.

Light emitted from the liquid crystal display passes through the polarizing filter 702 and is thus polarized. In contrast, ambient light in the environment is not polarized or only partially polarized. Polarized light emitted from the liquid crystal display is blocked at the camera 700 by polarizing filter 701 which is substantially crossed with respect to the polarizing filter at the liquid crystal display. This means that, in an image received at the camera 700, image regions corresponding to the liquid crystal display are dark. However, image regions corresponding to any objects between the liquid crystal display and the camera have a higher intensity. Ambient light (from light sources in the environment) which is reflected from any objects between the liquid crystal display and the camera is captured by the camera because it is not polarized. Light from the liquid crystal display which reflects or scatters from any objects between the liquid crystal display and the camera and is received by the camera may not be substantially polarized as a result of the reflection or scattering process. This light produces an image of any objects between the liquid crystal display and the camera because at least some of this unpolarized light is able to pass through the polarizing filter 701 into the camera.

Image segmentation has thus been achieved because those regions of the image corresponding to objects between the liquid crystal display and the camera have a much higher intensity than those regions of the image corresponding to the display itself. A thresholding operation may optionally be carried out on the image to discard image elements with an intensity lower than a specified threshold. A feathered mask may then be applied to smooth the edges of the remaining segmented image regions. For example, the thresholding operation and the masking operation may be carried out at the computer 706 in the archiving system.

This image segmentation process, using the polarizing filters, may be used as part of processes enabling functionality of the touch panel display. It may also be used as part of processes to capture and archive images of physical objects.

In order to discriminate between situations in which an object, such as a user's hand, is touching the touch panel display as opposed to hovering just above the touch panel display, the resistive touch overlay 703 is used. Resistive touch overlays are widely known are typically composed of layers of material which when touched cause a change in electrical current which is registered as a touch event and sent to a controller for processing.

Figure 7:
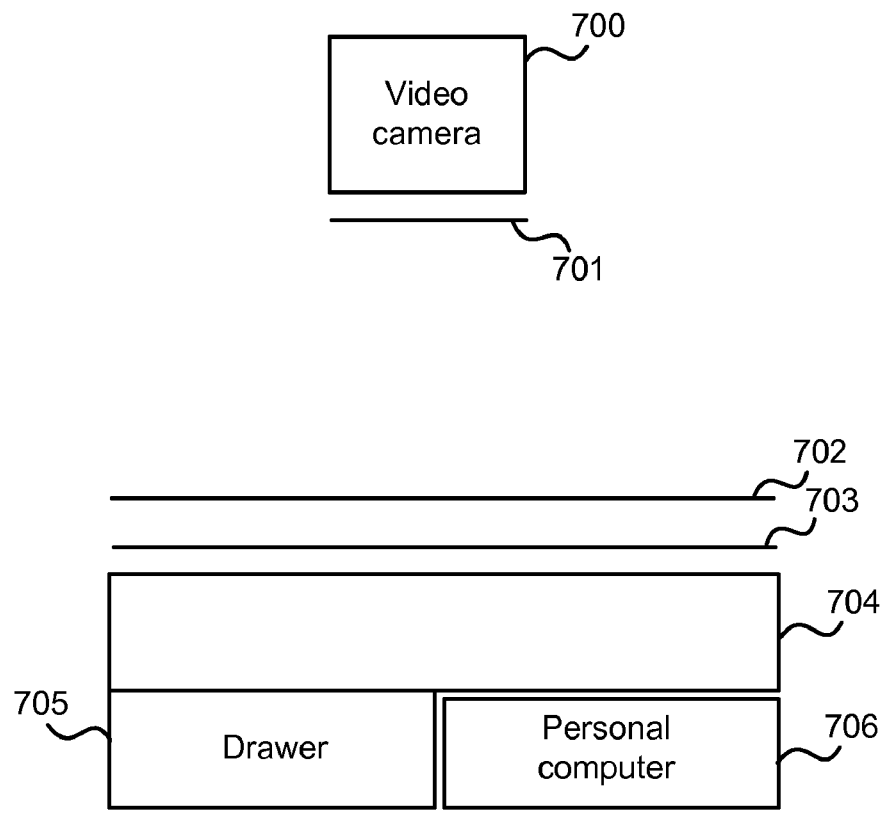
FIG. 7 is a schematic side view of an example archiving system using polarizing filters at a display and a camera.

A user is able to operate the multi-touch panel display provided using the liquid crystal display, resistive touch overlay 703 and polarizing filter 702, of FIG. 7 by placing his or her hands or digits on or just above the display and making hand gestures and movements which may be bi-manual. The multi-touch panel display provides a user interface whereby such gestures and movements are used to control software applications provided on a computer 706 at the archiving system. For example, the gestures and movements may be used to determine any one or more of translation, rotation and zooming of a digital object. In addition, the user may make inputs using a stylus on the liquid crystal display.

Figure 8:
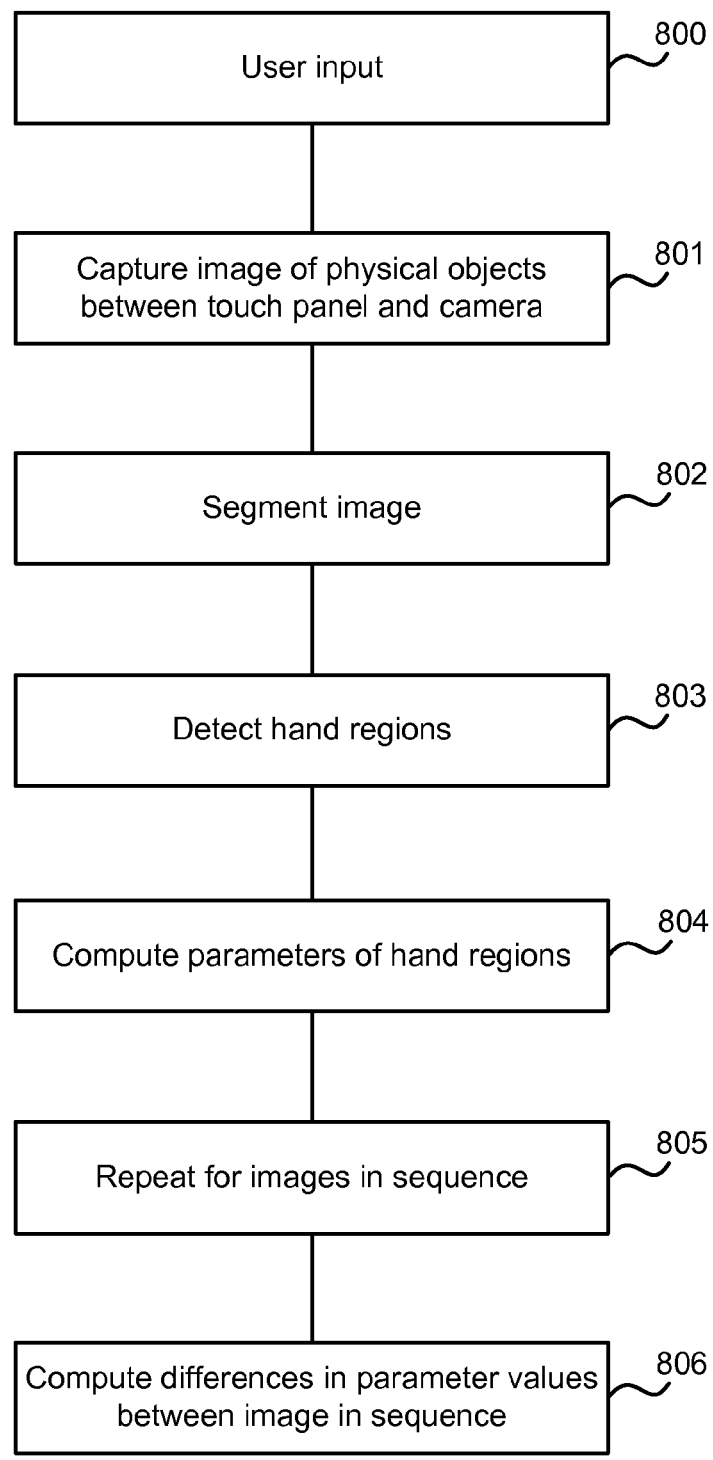
FIG. 8 is a block diagram of an example method of processing user input at an archiving system.

Referring to FIG. 8, one or more users make input which is sensed by the sensing apparatus. In this example of a multi-touch panel display, user input may comprise hand gestures made on or above the touch panel (block 800). Using image segmentation as described above, an image of a user's hand or hands is obtained together with images of any other physical objects such as pens, pieces of paper etc. that are on or above the multi-touch panel display (blocks 801 and 802). The segmented image is processed at the computer 706 to detect which regions in the image correspond to the user's hand or hands (block 803). This is achieved in any suitable manner, for example, using stored templates of hand images and comparing the segmented image regions with those stored templates.

Once a hand image region has been detected, parameters describing this region are computed (block 804). Any suitable parameters may be used such as centre of mass, principal axis and bounding area. For example, centre of mass, bounding box and principal axis of an individual connected component can be used to respectively translate, scale and rotate a virtual object.

This process is then repeated for images in a sequence (block 805) captured by the camera and differences are computed for corresponding parameters between images in the sequence (block 806). These difference values are then used, together with information from the resistive touch overlay to control display of information on the touch panel display.

In other embodiments optical flow techniques are used to enable translation, scaling and rotation of items presented on the display via hand gestures and movements. These optical flow techniques are described in "PlayAnywhere: A Compact Interactive Tabletop Projection-Vision System", Andrew D. Wilson, ACM UIST 2005.

Figure 9:
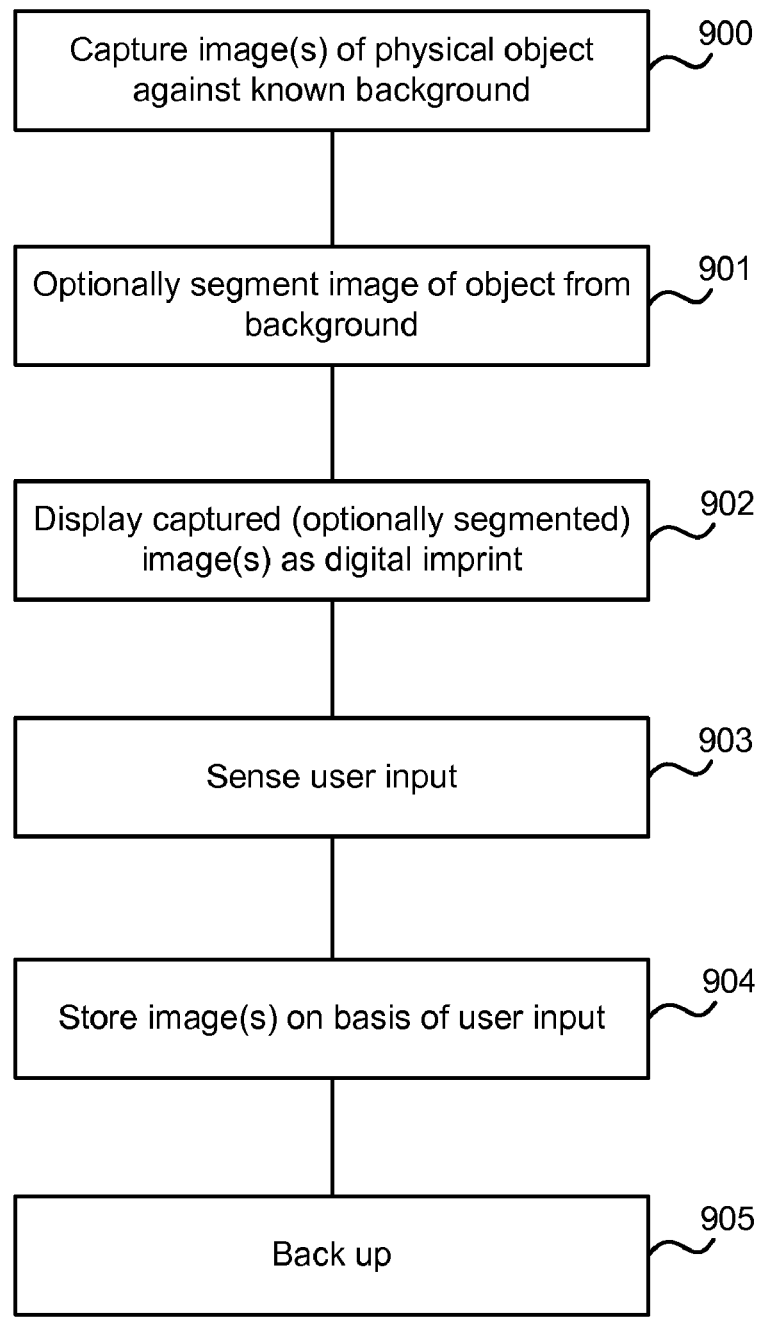
FIG. 9 is a block diagram of an example method of archiving images of a physical object at an archiving system.

The process of capturing images of physical objects in order to make a record of such physical objects for archiving is now described in more detail with reference to FIG. 9. For example, the physical objects may be a child's first pair of shoes, or a printed photograph.

A user places the physical object to be recorded on the display. One or more images of that object are then captured against a background (block 800). For example, the display may be arranged to present a uniform background color during this process or any other suitable background. Alternatively, the display may have a polarizing filter which is crossed with respect to a polarizing filter at a camera as described above with reference to FIG. 7. The captured images of the object may include the user's hand for example, if the user is holding that object in position. The images are captured using any suitable image capture device (or combination of such devices) provided in the archiving system. For example, this may be an over table camera such as camera 103 in FIG. 1. Alternatively, the display may itself be capable of capturing one or more images of the object. For example, a touch panel display may have scanning functionality.

The captured images are sent from the camera to a processor and associated memory provided in the archiving system. An optional image segmentation process (block 901) is then carried out to segment the background from the image of the object. Any suitable image segmentation process may be used. For example, if a known background was presented on the display, information about this known background may be used to carry out image segmentation. Alternatively, polarization information may be used as described above with reference to FIG. 7.

The captured image of the object, which has optionally been segmented, may then be presented on the display as a digital imprint of the object itself. That is, when a user removes the object from the display, the captured image of that object is presented in the place where the object had been (block 802). This provides an intuitive way in which a user is able to view the results of the image capture process.

In some embodiments, the image capture device comprises a camera having a range sensor which enables a 3D map of the surface of an object to be detected. Any suitable such camera may be used; a non-exhaustive list of examples includes those currently commercially available and those described in the following publications: "A CMOS 3D camera with millimetric depth resolution" by Niclass et al, IEEE Custom Integrated Circuits Conference pp 705-708 October 2004; "A time-of-flight depth sensor—system description, issues and solutions" Gokturk et al. Proceedings of the 2004 Conference on computer vision and pattern recognition workshop p35 2004. In other embodiments the image capture device comprises a 3D laser or infra-red scanner which enables a 3D map of the surface of an object to be detected.

The user is then able to make input which is sensed by the sensing apparatus (block 903) in order to organize, annotate and store the captured image as required (block 904). A back up process may be carried out to back up the captured image to a location remote of the archiving system (block 905).

Figure 10:
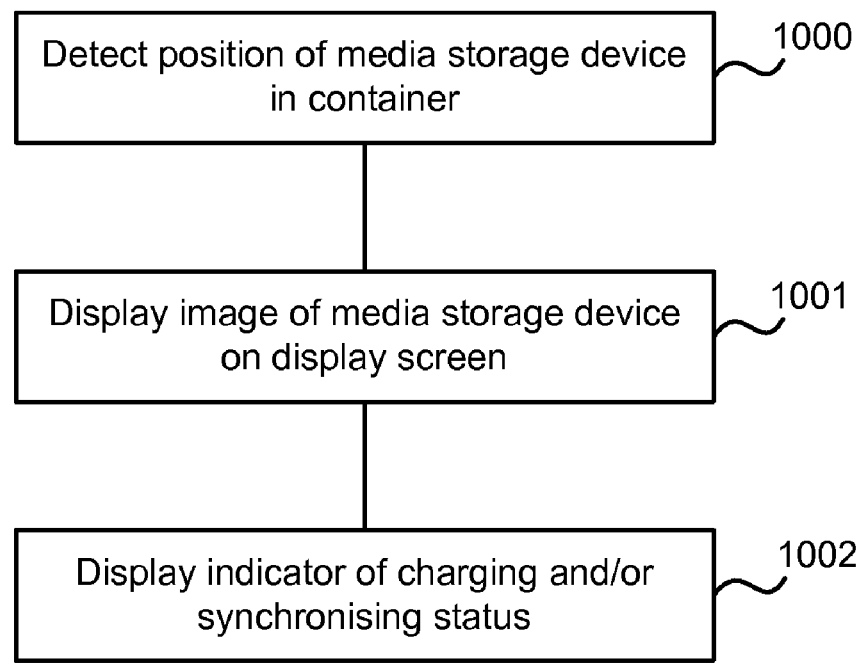
FIG. 10 is a block diagram of an example method of displaying indicators of charging and/or synchronizing status at a display of an archiving system.

As mentioned above with reference to FIG. 4 the receptacle 402 may comprise antennas 403 and cameras 404. In some embodiments the antennas 403 and the image capture devices 404 are used to obtain information about the position and/or outline of any devices in the drawer 402. This is now described in more detail with reference to FIG. 10. A position of a media storage device in the receptacle of the archiving system is detected (block 1000). For example, a triangulation process is carried out using the antenna input signals in order to detect the location of a media storage device in the receptacle. Information about the characteristics of the media storage device, such as information about its identity, power charging status, data synchronization status and so on may also be provided to the processor of the archiving system. For example, this information is transferred using the antennas 403 or via the power charging mechanism.

An image of the media storage device is then displayed (block 1001) at the display. The image may be an icon or other image representing the particular media storage device. For example, it may be a pre-configured image of a particular media storage device. Alternatively, the image of the media storage device may comprise an outline, silhouette or other image of the actual media storage device as obtained from cameras 404 in the receptacle. The position information may be used to influence location of the display of the image of the media storage device on the display. For example, in the case that the receptacle is a drawer under the display, the image or outline may be presented immediately above the media storage device in the drawer. In the case that the receptacle is a tray beside the touch panel display, the image may be presented in a representation of the tray on the display, using the position information.

It is also possible for the image of the media storage device to incorporate information about the power charging status and/or data synchronization status of that device (block 1002). For example, this information may be represented using colors or any other suitable markers.

In some embodiments physical objects are used which have bar codes displayed on them. These bar codes may be of any suitable type able to store information about the related physical object. For example, the bar codes may be simple one-dimensional bar codes that are visible to the human eye. They may also be bar codes presented in a manner invisible to the human eye but which can be detected using infra red light sources and detectors.

Figure 11:
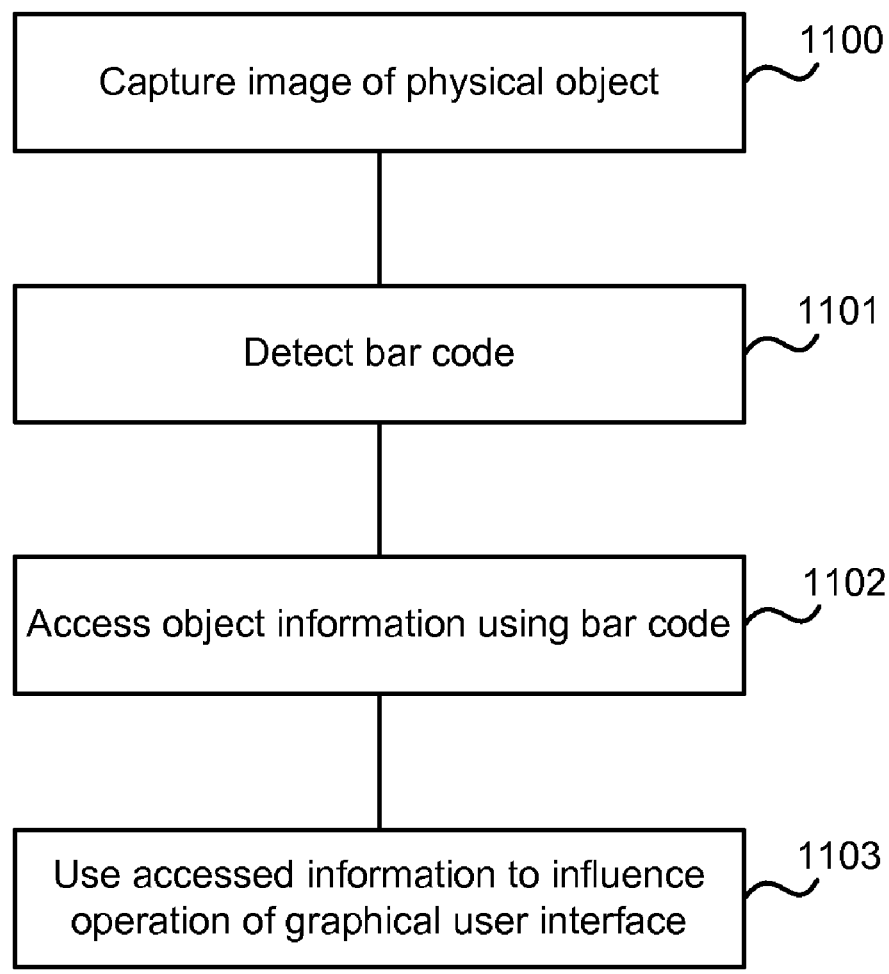
FIG. 11 is a block diagram of an example method of using bar code information.

With reference to FIG. 11 an image of a physical object is captured as described above (block 1100). A bar code in the image of the object is detected (block 1101) using pattern recognition or other image processing techniques. Information from the bar code is extracted (block 1102). For example, this information may indicate the type or function of the object, such that it is a stapler for example. Using this extracted information the operation of the graphical user interface at the display is then influenced (block 1103). For example, if a pile of images are presented on the display and the user places a stapler on the display (that stapler being sensed by the sensing apparatus), this may initiate an action to group or attach the images in the pile together.

Exemplary Computing-Based Device

Figure 12:
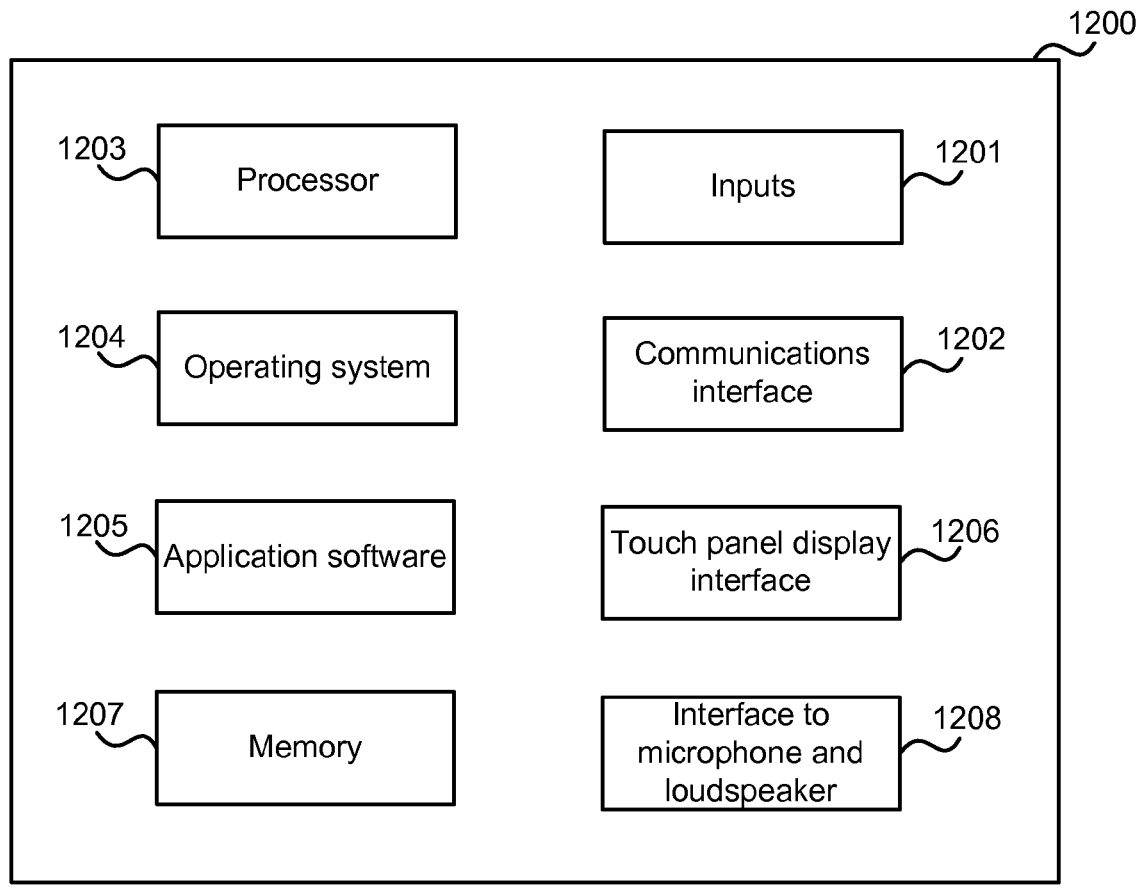
FIG. 12 illustrates an exemplary computing-based device in which embodiments of an archiving system may be implemented.

FIG. 12 illustrates various components of an exemplary computing-based device 1200 which may be implemented as any form of a computing and/or electronic device, and in which embodiments of an archiving system may be implemented.

The computing-based device 1200 comprises one or more inputs 1201 which are of any suitable type for receiving images captured by an image capture device such as a camera. The device also comprises communication interface 1202 which is arranged to transmit data during synchronization of the computing-based device 1200 and one or more media storage devices such as mobile telephones, digital cameras, personal digital assistants and the like.

Computing-based device 1200 also comprises one or more processors 1203 which may be microprocessors, controllers or any other suitable type of processors for processing computing executable instructions to control the operation of the device in order to provide an archiving system. Platform software comprising an operating system 1204 or any other suitable platform software may be provided at the computing-based device to enable application software 1205 to be executed on the device.

The computer executable instructions may be provided using any computer-readable media, such as memory 1207. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An interface 1206 is provided to a touch panel display which may be a multi-touch panel display.

An interface 1208 to a microphone and loudspeaker may optionally be provided.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An archiving system comprising:
   a multi-touch display device integrated into a surface of a table, the multi-touch display device configured for two-handed user input;
   an image capture device arranged to capture an image of a physical object placed on or above the surface of the multi-touch display device;
   a receptacle arranged to hold an electrically rechargeable handheld digital media storage device, the receptacle including inductive pads for automated power charging of the handheld digital media storage device;
   a data transmission device, integrated in the receptacle and arranged to provide data transmission with the handheld digital media storage device to receive a digital image;
   a sensing apparatus arranged to detect user input to the archiving system comprising position of the physical object in relation to the multi-touch display device and/or a finger of a user in relation to the multi-touch display device;
   a processor arranged to control operation of the archiving system comprising displaying, on the multi-touch display device, the captured image of the physical object, the digital image received from the digital media storage device, and a multi-touch graphical user interface for organizing the captured image of the physical object and the digital image into a single archive associated with an event identifier; and
   a memory, coupled to the processor, arranged to store the single archive associated with the event identifier.

2. An archiving system as claimed in claim 1 wherein the receptacle is a drawer.

3. An archiving system as claimed in claim 1 wherein the image capture device is integral with the display.

4. An archiving system as claimed in claim 1 wherein the image capture device is a camera supported such that its field of view comprises at least part of the display.

5. An archiving system as claimed in claim 1 which comprises a power charging apparatus, integrated in the receptacle and arranged to provide power charging to the handheld digital media storage device.

6. An archiving system as claimed in claim 1 wherein the image capture device comprises at least one camera mounted inside the receptacle.

7. An archiving system as claimed in claim 5 wherein the power charging apparatus and the data transmission device are integrated together and provide physical connectionless power charging and data transmission to the handheld digital media storage device.

8. An archiving system as claimed in claim 2 wherein the drawer is arranged to form a Faraday cage when closed.

9. An archiving system as claimed in claim 1 wherein the receptacle comprises one or more location sensors to sense location of objects in the receptacle.

10. An archiving system as claimed in claim 1 wherein the multi-touch display comprises a first polarizing filter overlay and the image capture device comprises a second polarizing filter overlay having a polarization substantially crossed with respect to the first polarizing filter overlay.

11. An archiving system as claimed in claim 1 wherein the display comprises a resistive touch overlay.

12. An archiving system comprising:
    a table comprising a multi-touch display integrated into a surface;

an image capture device arranged to capture an image of a physical object placed on the surface of the multi-touch display, the image capture device comprising a digital camera;

a drawer in the table arranged to hold at least one electrically rechargeable handheld digital media storage device, the drawer configured to upload data from the handheld digital media storage device, to download data to the handheld digital media storage device, or to synchronize the handheld digital media storage device with a computing device associated with the archiving system;

a data transmission device, integrated in the drawer and arranged to provide data transmission with the handheld digital media storage device to receive a digital image;

a sensing apparatus arranged to detect user input to the archiving system comprising position of at least one physical object in relation to the display;

an infrared projection device directed towards the surface of the multi-touch display and an infrared detection device configured to detect characteristics of an item located on or near the multi-touch display;

a processor arranged to control operation of the archiving system comprising displaying, on the multi-touch display device, the captured image of the physical object, the digital image received from the digital media storage device, and a multi-touch graphical user interface for organizing the captured image of the physical object and the digital image into a single archive associated with an event identifier; and a memory, coupled to the processor, arranged to store the single archive associated with the event identifier, both the processor and the memory being integrated into the table.

13. An archiving system as claimed in claim 12 wherein the image capture device is supported over the surface of the table into which the display is integrated.

14. An archiving system as claimed in claim 12 wherein the image capture device is integrated with the display.

15. An archiving system as claimed in claim 12 which comprises a power charging apparatus, integrated into the drawer and arranged to provide power charging to the handheld digital media storage device.

16. An archiving system comprising:

an image capture device arranged to capture images of physical objects placed on or above a top surface of a table, the image capture device comprising a video camera having a first polarizing filter;

a receptacle arranged to hold at least one handheld digital media storage device, the receptacle configured to detect a power charging status of the at least one handheld digital media storage device and to display the power charging status to a user;

a data transmission device, integrated in the receptacle and arranged to provide data transmission with the handheld digital media storage device;

a display integrated into the top surface of the table, the display having a second polarizing filter substantially crossed with respect to the first polarizing filter;

a sensing apparatus arranged to detect user input to the archiving system comprising position of at least one physical object in relation to the display;

a processor arranged to control operation of the archiving system comprising displaying, on the display, the captured image of the physical object, the digital image received from the digital media storage device, and a graphical user interface for organizing the captured image of the physical object and the digital image into a single archive associated with an event identifier; and a memory, coupled to the processor, arranged to store the single archive associated with the event identifier.

17. An archiving system as claimed in claim 16 wherein the display is a multi-touch panel display.

* * * * *